G. A. UNGAR.
JOINT.
APPLICATION FILED DEC. 11, 1919.

1,403,064.

Patented Jan. 10, 1922.

INVENTOR
G. A. Ungar
BY
Duell, Warfield & Duell
ATTORNEY

UNITED STATES PATENT OFFICE.

GUSTAVE A. UNGAR, OF PELHAM MANOR, NEW YORK, ASSIGNOR TO F. R. BLAIR & CO., INC., OF NEW YORK, N. Y., A CORPORATION OF NEW YORK.

JOINT.

1,403,064.   Specification of Letters Patent.   Patented Jan. 10, 1922.

Application filed December 11, 1919.   Serial No. 344,034.

*To all whom it may concern:*

Be it known that I, GUSTAVE A. UNGAR, a citizen of the United States, residing at Pelham Manor, in the county of Westchester and State of New York, have invented certain new and useful Improvements in Joints, of which the following is a full, clear, and exact description, such as will enable others skilled in the art to which it appertains to make and use the same.

This invention relates to joints, and with respect to its more specific features to joints between such parts as a hub and a shaft, as, for instance, in a flexible disk coupling; a power wheel, or other rotary machine part.

One of the objects of the invention is to provide a strong joint adapted to stand up efficiently under rotary strain.

Another object is the provision of a simple and efficient construction whereby a thin metallic shaft may be strongly fastened to a hub in concentric relation.

Other objects will be in part obvious and in part pointed out hereinafter.

The invention accordingly consists in the features of construction, combinations of elements and arrangement of parts, which will be exemplified in the construction hereinafter described and the scope of the application of which will be indicated in the following claims.

In the accompanying drawing forming a part of this specification and wherein similar reference characters refer to similar parts throughout the several views,—

Figure 1:
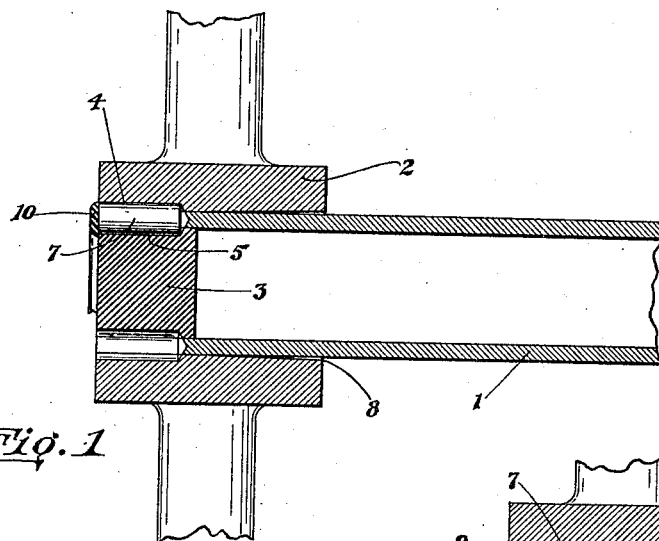
Figure 1 is a central longitudinal section through a power wheel hub and a shaft embodying the invention.
Figure 2:
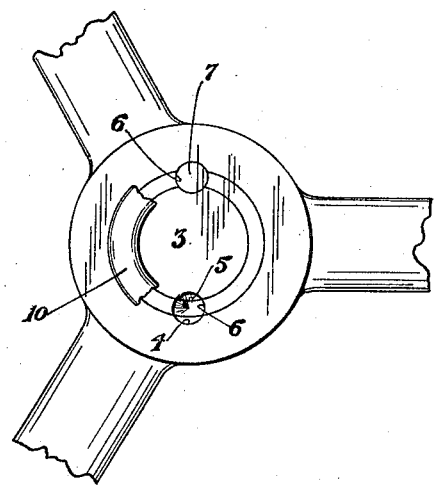
Fig. 2 is an end view of Fig. 1.

Referring now more specifically to the drawings, the numeral 1 indicates a driving shaft which, in the present embodiment, is illustrated as a hollow shaft of relatively thin metal as steel or brass. The numeral 2 indicates a metal ring, as, for instance, the hub portion of a power wheel, flexible coupling spider, or other rotary power element. The numeral 3 indicates a metal brace, or plug, fitting within the end of the hollow shaft 1 and being transversely opposite the ring 2. In the inner face of the ring 2 is cut a recess 4 and in the outer face of the brace, or plug, 3, is cut a recess 5. The end of the shaft 1 is also recessed as indicated at 6. The several parts, to wit, the shaft 1, ring or hub 2 and brace or plug 3, are assembled in concentric relation, as illustrated in Fig. 1, with the several recesses 4, 5 and 6 registering with each other, in which relation it will be seen that the several recesses provide an opening intersecting the meeting surfaces of the parts. A pin 7 is then driven into the opening thus formed and retains the parts from rotation relative to each other as well as in concentric relation.

To produce the joint referred to the thin metallic shaft 1 has a driving, pressed, or shrunk fit assembly with the ring 2, as has the brace or plug 3 with the shaft 1. Thereupon the pin opening is longitudinally bored so as to intersect the meeting surfaces of the shaft, ring, and brace and thereafter a pin is inserted in the opening with a driving fit. In this manner the joint is efficiently produced in a simple and inexpensive manner and there is practically no liability of the parts changing their relative relationship under the strains engendered in use. On the contrary, the concentricity of the shaft and the ring or hub is maintained through the life of the coupling or joint.

In one of the embodiments illustrated, provision is also made for decreasing any liability of the shaft to fracture at the end of the ring 2 where the shaft emerges therefrom. For this purpose the shaft opening in the ring 2 is made of slightly greater diameter than the shaft at that end of the ring from which the shaft projects, as illustrated at 8, the shaft opening gradually decreasing in diameter to closely fit the shaft intermediate the length of the ring. In this wise abrupt bending of the shaft as by fulcruming around the edge of the opening in the ring, is avoided, and any bending is gradual and ordinarily will be largely within the limit of elasticity of the metal of which the shaft is composed. In the forms illustrated the boring is effected at two diametrically opposite points and two pins are employed.

Figure 3:
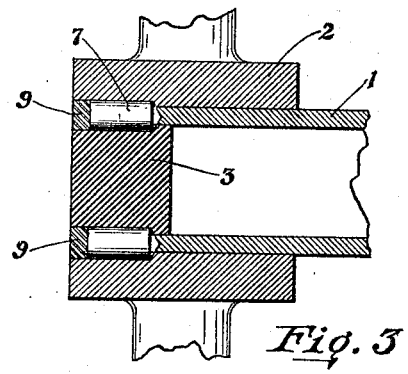
Fig. 3 is a longitudinal section of a modified construction embodying the invention.

In the modified form shown in Fig. 3, the pins 7 are countersunk and capped with filling material of some kind, such as solder, as indicated at 9.

Figure 4:
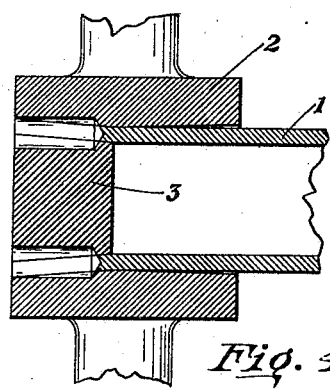
Fig. 4 is a longitudinal section of another modified construction embodying the invention.

In the modification shown in Fig. 4 the opening in the ring in the finished joint is tapered, the end of the shaft 1, both inside and outside, is tapered to fit the taper ring opening, and the plug 3 is likewise tapered to fit the inner taper of the shaft. In this form there is great resistance to end thrust in one direction. Or to obtain the arrangement illustrated in Fig. 4 the end of shaft 1 may be initially cylindrical and inserted in the ring or hub 2. Thereupon the tapered plug 3 may be driven in so as to expand the end of shaft 1 into conformity with the taper in the ring 2 and into close contact.

In either form, a flush or a countersunk pin may be employed. Where the meeting surfaces of the ring, brace and shaft open into the end face of the assemblage, the annular joints formed by such meeting surfaces may be covered with solder or brazed or welded together, as may be preferred. A ring of solder for the purpose is indicated at 10, partly broken away. In this wise the pins 7 are securely retained in place and the ring, plug and shaft locked against relative axial displacement due to end thrust.

When power is applied to rotate the shaft, the hub 2 is rotated practically as a part thereof, there being no perceptible back lash or looseness. Should there be any strain between the shaft and hub such as to tend to deflect the shaft radially of the hub, the relief space 8 permits the shaft to deflect in a long curve entering the hub, the deflected portion being progressively brought against the flaring inner wall of the hub and being reinforced thereby. In this wise abrupt deflection or bending around the outer edge of the opening in the hub may be avoided, and any tendency of the shaft to fracture on account of abrupt deflection may be eliminated.

Thus by the above described construction are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent, is:—

1. In a device of the character described, in combination, a ring, a relatively thin hollow shaft having a driving fit in said ring, a brace having a driving fit in said shaft opposite said ring, said ring, shaft and brace each having longitudinally extending registering recesses providing a longitudinally extending opening intersecting the meeting surfaces of said ring, shaft and brace, and a pin having a driving fit in said opening.

2. In a device of the character described, in combination, a ring, a relatively thin hollow shaft having a driving fit in said ring, a brace having a driving fit in said shaft opposite said ring, said ring, shaft and brace each having longitudinally extending registering recesses providing a longitudinally extending opening intersecting the meeting surfaces of said ring, shaft and brace, and a pin having a driving fit in said opening, said pin being countersunk in the opening and capped with filling.

3. In a device of the character described, in combination, a ring having a longitudinally tapered inner face, a relatively thin hollow shaft having a counterpart tapered portion fitting the tapered face of said ring, a taper brace fitting the taper of said shaft opposite said ring, said ring, shaft and brace each having longitudinally extending recesses providing a longitudinally extending opening intersecting the tapered meeting faces of said ring, shaft and brace, and a pin closely fitting said opening.

4. In a device of the character described, in combination, a ring, a shaft entering said ring and coupled thereto to transmit rotary motion, the shaft opening in said ring being of slightly greater diameter than the shaft at the end of the ring from which the shaft projects and gradually decreasing in diameter to closely fit the shaft intermediate the length of the ring.

5. In a device of the character described, in combination, a ring, a hollow relatively thin shaft entering said ring and coupled thereto to transmit rotary motion, the shaft opening in said ring being of slightly greater diameter than the shaft at the end of the ring from which the shaft projects and gradually decreasing in diameter to closely fit the shaft intermediate the length of the ring, a brace within said shaft opposite said ring, said ring, shaft and brace having longitudinally extending recesses providing a longitudinally extending opening intersecting the meeting surfaces of said ring, shaft and brace, and a pin closely fitting said opening.

In testimony whereof I affix my signature, in the presence of two witnesses.

G. A. UNGAR.

Witnesses:
J. W. ANDERSON,
LAURA E. SMITH.